(12) United States Patent
Ito et al.

(10) Patent No.: US 9,141,428 B2
(45) Date of Patent: Sep. 22, 2015

(54) INFORMATION PROCESSING APPARATUS AND INFORMATION PROCESSING METHOD

(71) Applicant: FUJITSU LIMITED, Kawasaki-shi, Kanagawa (JP)

(72) Inventors: Hidenobu Ito, Kawasaki (JP); Kazuaki Nimura, Kawasaki (JP); Yosuke Nakamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/750,274

(22) Filed: Jan. 25, 2013

(65) Prior Publication Data

US 2013/0326533 A1    Dec. 5, 2013

(30) Foreign Application Priority Data

May 31, 2012   (JP) .................. 2012-124554

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *G06F 9/50* | (2006.01) | |
| *G06F 21/51* | (2013.01) | |
| *G06F 21/62* | (2013.01) | |

(52) U.S. Cl.
CPC .............. *G06F 9/5016* (2013.01); *G06F 21/51* (2013.01); *G06F 21/6209* (2013.01)

(58) Field of Classification Search
CPC .... G06F 9/5016; G06F 21/51; G06F 21/6209
USPC ......................................................... 719/319
See application file for complete search history.

(56) References Cited

U.S. PATENT DOCUMENTS

| | | | |
|---|---|---|---|
| 2002/0161996 A1* | 10/2002 | Koved et al. .................. | 713/150 |
| 2003/0074656 A1 | 4/2003 | Irino | |
| 2003/0191951 A1* | 10/2003 | Cross .......................... | 713/189 |
| 2004/0091114 A1 | 5/2004 | Carter et al. | |
| 2006/0210082 A1* | 9/2006 | Devadas et al. .............. | 380/277 |
| 2010/0205274 A1 | 8/2010 | Gharabally et al. | |
| 2012/0317233 A1* | 12/2012 | Redpath ........................ | 709/218 |

FOREIGN PATENT DOCUMENTS

| | | |
|---|---|---|
| JP | 2002-222081 | 8/2002 |
| JP | 2006-510958 | 3/2006 |
| JP | 2010-182309 | 8/2010 |
| WO | WO 2004/034184 A2 | 4/2004 |

* cited by examiner

*Primary Examiner* — Timothy A Mudrick
(74) *Attorney, Agent, or Firm* — Oblon, McClelland, Maier & Neustadt, L.L.P.

(57) ABSTRACT

An information processing apparatus executes an application program including an application resource and a runtime. The information processing apparatus includes a memory, and a processor that executes a procedure in the memory. The procedure includes generating a process space in the memory to invoke the application program, loading the runtime into the process space, loading the application resource into the process space into which the runtime is loaded, generating a process of the application program based on the application resource and the runtime which are loaded into the process space, and executing the process of the application program.

20 Claims, 12 Drawing Sheets

INFORMATION PROCESSING APPARATUS AND INFORMATION PROCESSING METHOD

CROSS-REFERENCE TO RELATED APPLICATION

This application is based upon and claims the benefit of priority from the prior Japanese Patent Application No. 2012-124554 filed on May 31, 2012, the entire contents of which are incorporated herein by reference.

FIELD

The embodiment discussed herein is related to an information processing apparatus, an information processing method, and a medium.

BACKGROUND

In recent years, with the widespread availability of wireless networks, such as 3G/LTE (Long Term Evolution) and hot spots develop, for example, an environment is provided in which an information processing apparatus such as a smartphone may be connected to a network at all times.

An information processing system is developed which delivers an application program from an application server (application store) to an information processing apparatus at a requested time and causes the information processing apparatus to execute the application program by utilizing such an environment. Also an information processing system is developed which provides an application program registered in an application server to an information processing apparatus according to a request from a user. In such systems, the application processing apparatus downloads an application program delivered from the application server and installs the application program in a storage device such as a flash memory.

Japanese Laid-open Patent Publication No. 2010-182309 is an example of related art.

SUMMARY

According to an aspect of the invention, an information processing apparatus that executes an application program including an application resource and a runtime, the information processing apparatus including a memory, and a processor that executes a procedure in the memory, the procedure including generating a process space in the memory to invoke the application program, loading the runtime into the process space, loading the application resource into the process space into which the runtime is loaded, generating a process of the application program based on the application resource and the runtime which are loaded into the process space, and executing the process of the application program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, an embodiment will be described with reference to the drawings.

While inventing the present embodiments, observations were made regarding a related art. Such observations include the following, for example.

In a related art, there are two types of application programs, which are an application program (called a native application) that may be directly interpreted and executed by an OS (operating system) and an application program (called a hybrid application) including a runtime that may be directly interpreted and executed by the OS and resources that may be interpreted by the runtime. The resource here is a program written in, for example, HTML or Javascript (registered trademark). An example of the hybrid application is a Phone-Gap application. The resource in the hybrid application is independent from the OS, so that the hybrid application has an advantage that a developer may easily create application programs running on different OSes by replacing only a runtime which depends on the OS.

When delivering such a hybrid application to an information processing apparatus on which a specific OS is running, normally, a hybrid application, in which a runtime executable on the OS and resources are integrated and compiled to be converted into a native application format executable on the OS, is delivered.

However, when installing a plurality of hybrid applications that use the same runtime into an information processing apparatus, the same runtime is included in all the hybrid applications, so that a storage area is uselessly consumed. Some OSes require user's operation by display a confirmation screen when installing a native application. For example, in Android, when installing an application, a screen for determining whether or not to allow use of devices (GPS, acceleration sensor, and the like) that will be used by the application is displayed and the application may be installed only after the user presses a consent button. This is a useful security method to avoid installing a malicious application program. However, since this method requires a user operation, there is a problem that usability degrades in a system in which many installation operations are performed. General hybrid applications are delivered in a form converted into the native application format, so that they have the same problem.

Therefore, when considering a system in which many hybrid applications are automatically installed and executed, there are a problem of inefficient consumption of storage area and a usability problem caused by an increase of user operations.

Figure 1:
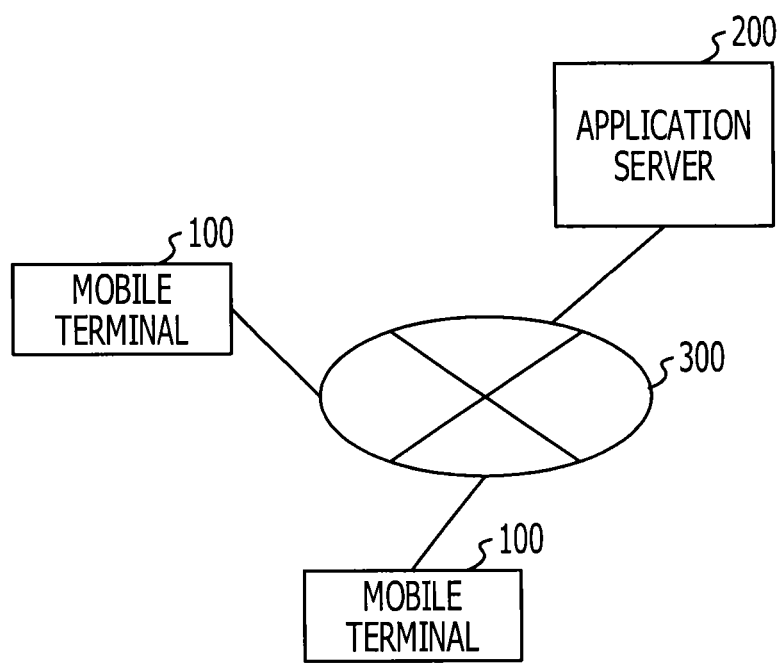
FIG. 1 is a schematic diagram of an information processing apparatus according to an embodiment.

FIG. 1 is a schematic diagram of an information processing apparatus according to the embodiment.

As illustrated in FIG. 1, the information processing apparatus according to the embodiment includes a mobile terminal 100 and an application server 200. The mobile terminal 100 and the application server 200 are connected to each other through a network 300. An application in the mobile terminal 100 is executed by runtime interpreting application resources. Hereinafter, the "application" is described as a function realized when a CPU 101 executes an application program.

Hardware Configuration of Mobile Terminal 100

Figure 2:
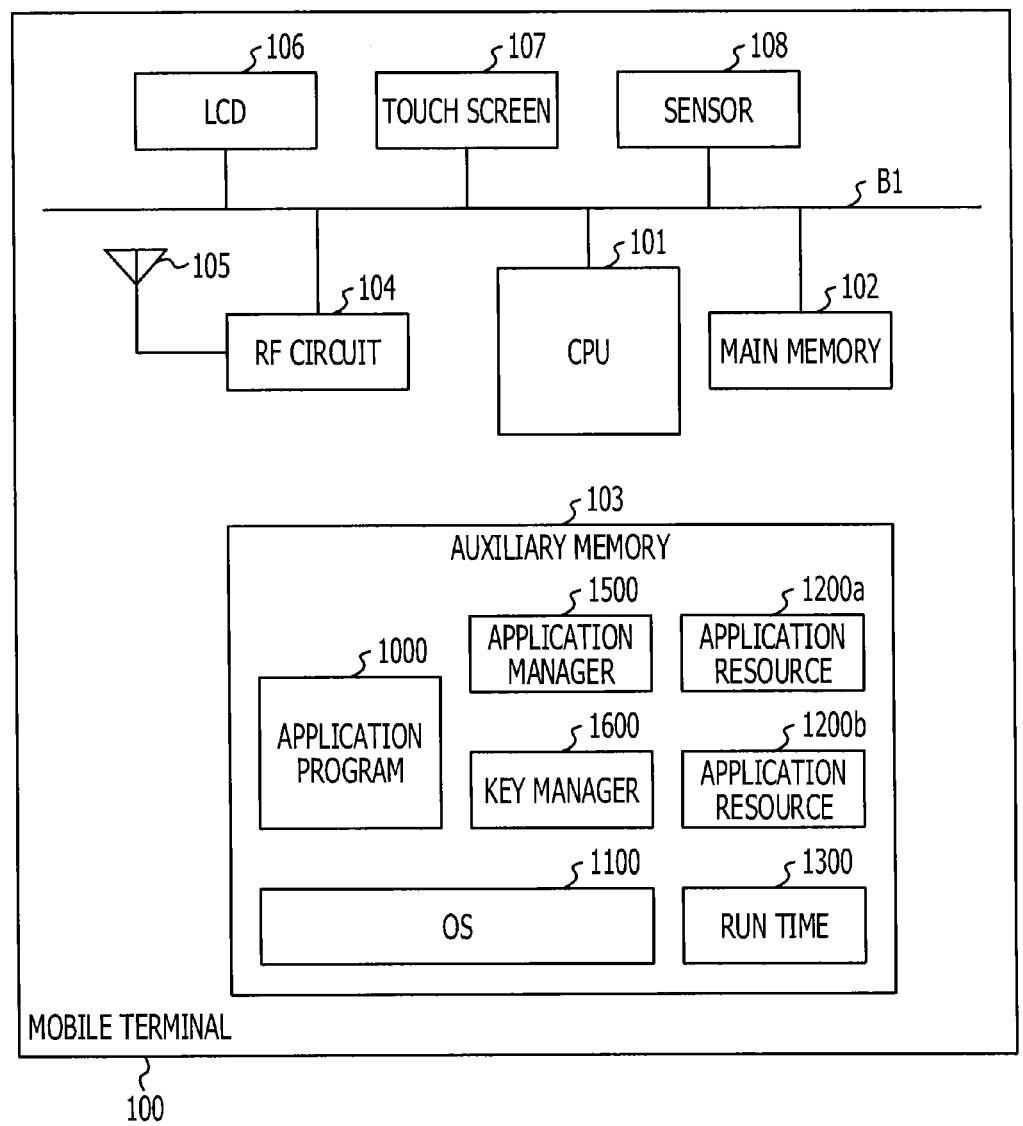
FIG. 2 is a schematic diagram of a hardware configuration of a mobile terminal according to the embodiment.

FIG. 2 is a schematic diagram of a hardware configuration of the mobile terminal 100 according to the embodiment.

In the embodiment, for example, a smartphone and a tablet PC (Personal Computer) are assumed to be the mobile terminal 100.

As illustrated in FIG. 2, the mobile terminal 100 according to the embodiment includes a CPU (Central Processing Unit) 101, a main memory 102, an auxiliary memory 103, an RF (Radio Frequency) circuit 104, an antenna 105, an LCD (Liquid Crystal Display) 106, a touch screen 107, and various sensors 108.

The CPU 101, the main memory 102, the auxiliary memory 103, the RF circuit 104, the LCD 106, the touch screen 107, and the various sensors 108 are connected to each other through, for example, a bus B1.

The CPU 101 controls various hardware in the mobile terminal 100. Further, particular function is realized when the CPU 101 loads particular program stored in the auxiliary memory 103 into the main memory 102 and then executes the program in the main memory 102. The details of each function will be described later.

The main memory 102 stores various programs to be executed by the CPU 101. Further, the main memory 102 is used as a work area of the CPU 101 and stores various data used for the CPU 101 to execute processing. As the main memory 102, for example, a RAM (Random Access Memory) may be used.

The auxiliary memory 103 stores various programs to be operated on the mobile terminal 100. As the various programs, for example, an application program 1000, an application manager 1500, and a key manager 1600 which are executed by the CPU 101, an OS 1100 which is an execution environment of these programs, and application resources 1200a and 1200b and a runtime 1300 which are downloaded from the application server 200 are stored. Further, the auxiliary memory 103 may store application programs downloaded from the application server 200 as the various programs.

Although the type of the OS 1100 is not particularly limited, Android (registered trademark) is used in the embodiment. The OS 1100 realizes a memory management unit 112, a runtime load unit 113, a process execution unit 117, and an access management unit 118, which will be described later, by being executed by the CPU 101.

The runtime 1300 is a kind of native application that may be directly interpreted and executed by the OS 1100. The runtime 1300 is compiled along with the application resources 1200a and 1200b so that a hybrid application is formed. The runtime 1300 performs an application resource load unit 114 and a process generation unit 116, which will be described later, by being executed by the CPU 101. Further, the runtime 1300 includes an I/O driver 1300D. The I/O driver 1300D realizes a decrypting unit 115 described later by being executed by the CPU 101. Although, in the embodiment, the I/O driver 1300D is included in the runtime 1300, the embodiment is not limited to this.

The application manager 1500 includes a launcher 1500a and a downloader 1500b (not illustrated in FIG. 2). The launcher 1500a performs an application start-up instruction reception unit 110 and a launcher unit 111, which will be described later, by being executed by the CPU 101. The downloader 1500b performs a download unit 121 described later by being executed by the CPU 101. The key manager 1600 performs a key management unit 120 described later by being executed by the CPU 101.

As the auxiliary memory 203, for example, a non-volatile memory, such as a hard disk or a flash memory, may be used. The details of the application resources 1200a and 1200b and the runtime 1300 will be described later.

The RF circuit 104 is controlled by the CPU 101 and transmits a high frequency signal from the antenna 105 to another wireless communication apparatus. Further, the RF circuit 104 converts a high frequency signal received by the antenna 105 into a baseband signal and sends the baseband signal to the CPU 101.

The LCD 106 is controlled by the CPU 101 and displays image information to a user. The touch screen 107 is attached to a display screen of the LCD 106 and detects a contact position at which, for example, a finger of a user comes into contact with the touch screen 107. Touch screen 107 may be called a touch panel.

Each of the various sensors 108 is controlled by the CPU 101 and acquires state information of the mobile terminal 100. As the sensors 108, for example, an acceleration sensor, a gyro sensor, an illuminance sensor, a geomagnetic sensor, a tilt sensor, a pressure sensor, an approach sensor, a temperature sensor, a 3G, a wireless LAN, and a GPS module may be used.

Hardware Configuration of Application Server 200

Figure 3:
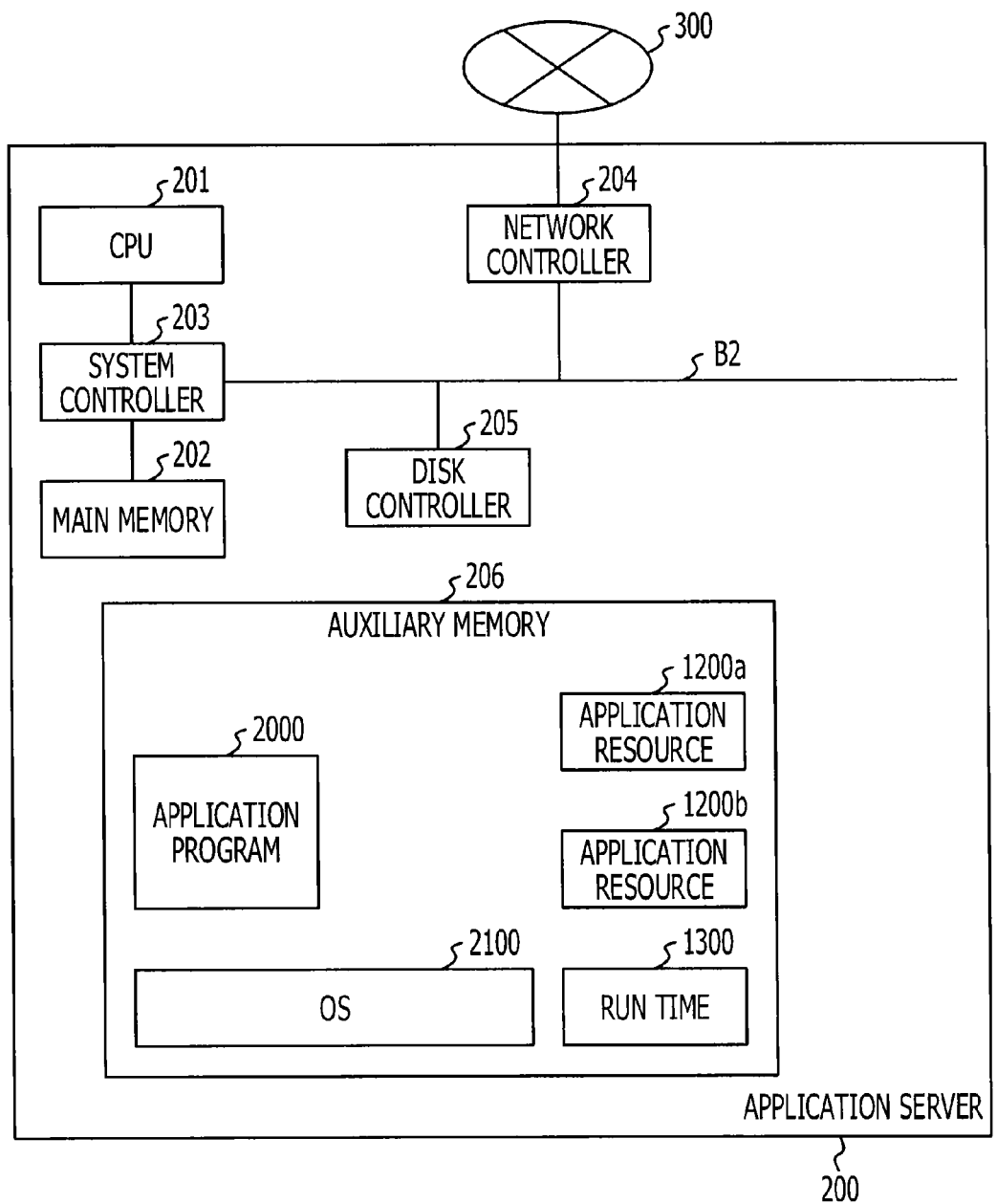
FIG. 3 is a schematic diagram of a hardware configuration of an application server according to the embodiment.

FIG. 3 is a schematic diagram of a hardware configuration of the application server 200 according to the embodiment.

As illustrated in FIG. 3, the application server 200 according to the embodiment includes a CPU 201, a main memory 202, a system controller 203, a network controller 204, a disk controller 205, and an auxiliary storage device 206.

The CPU 201, the main memory 202, the system controller 203, the network controller 204, and the disk controller 205 are connected to each other through, for example, a bus B2.

The CPU 201 controls various hardware in the application server 200. Further, particular function is realized when the CPU 201 loads particular program stored in the auxiliary memory 206 into the main memory 202 and then executes the program in the main memory 202. The details of each function will be described later.

The main memory 202 stores various programs to be executed by the CPU 201. Further, the main memory 202 is used as a work area of the CPU 201 and stores various data used for the CPU 201 to execute processing. As the main memory 202, for example, a RAM may be used.

The system controller 203 is connected to both the CPU 201 and the main memory 202. The system controller 203 controls data transmission between the CPU 201 and the main memory 202 and data transmission between the CPU 201 and the bus B2. Further, the system controller 203 is connected to the network controller 204 and the disk controller 205 through the bus B2.

The network controller 204 is connected to the mobile terminal 100 through the network 300 and transmits and receives various data to and from the mobile terminal 100.

The auxiliary storage device 206 is connected to the disk controller 205. The auxiliary storage device 206 stores various programs. As the various programs, for example, an application program 2000 which is executed by the CPU 201, an OS 2100 which is an execution environment of the application program 2000, and the application resources 1200a and 1200b and the runtime 1300 which are to be downloaded to the mobile terminal 100 are stored. Not only the application resources 1200a and 1200b but also a native application to be downloaded to the mobile terminal 100 can be stored in the auxiliary storage device 206. As the auxiliary storage device 206, for example, a hard disk may be used.

Configurations of Application Programs 1400a and 1400b

Here, configurations of the application programs 1400a and 1400b, which are hybrid applications, will be described.

Figure 4A:
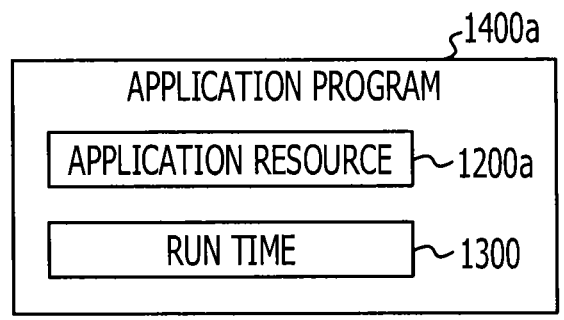
FIGS. 4A and 4B are schematic diagrams of an application program according to the embodiment.
Figure 4B:
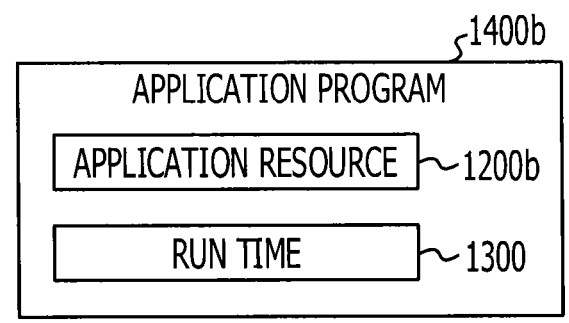

FIGS. 4A and 4B are schematic diagrams of the application programs 1400a and 1400b according to the embodiment. FIGS. 4A and 4B illustrate the application programs 1400a and 1400b for different applications from each other.

As illustrated in FIGS. 4A and 4B, the application programs 1400a and 1400b executed by the mobile terminal 100 are hybrid applications and include the application resources 1200a and 1200b which are created for each application and the runtime 1300 which is common to the applications.

The application resources 1200a and 1200b are, for example, program files developed by an application developer. The application resources 1200a and 1200b do not have an executable format that may be interpreted by the OS 1100, so that the application resources 1200a and 1200b are recognized as data files by the OS 1100. The application resources 1200a and 1200b are written in, for example, HTML or Java (registered trademark) script.

The runtime 1300 provides an execution environment to execute the application resources 1200a and 1200b as application programs to the mobile terminal 100. The runtime 1300 is a kind of native application and has an executable format that may be interpreted by the OS 1100, so that the runtime 1300 is recognized as an application program by the OS 1100.

Functional Blocks of Mobile Terminal 100

Figure 5:
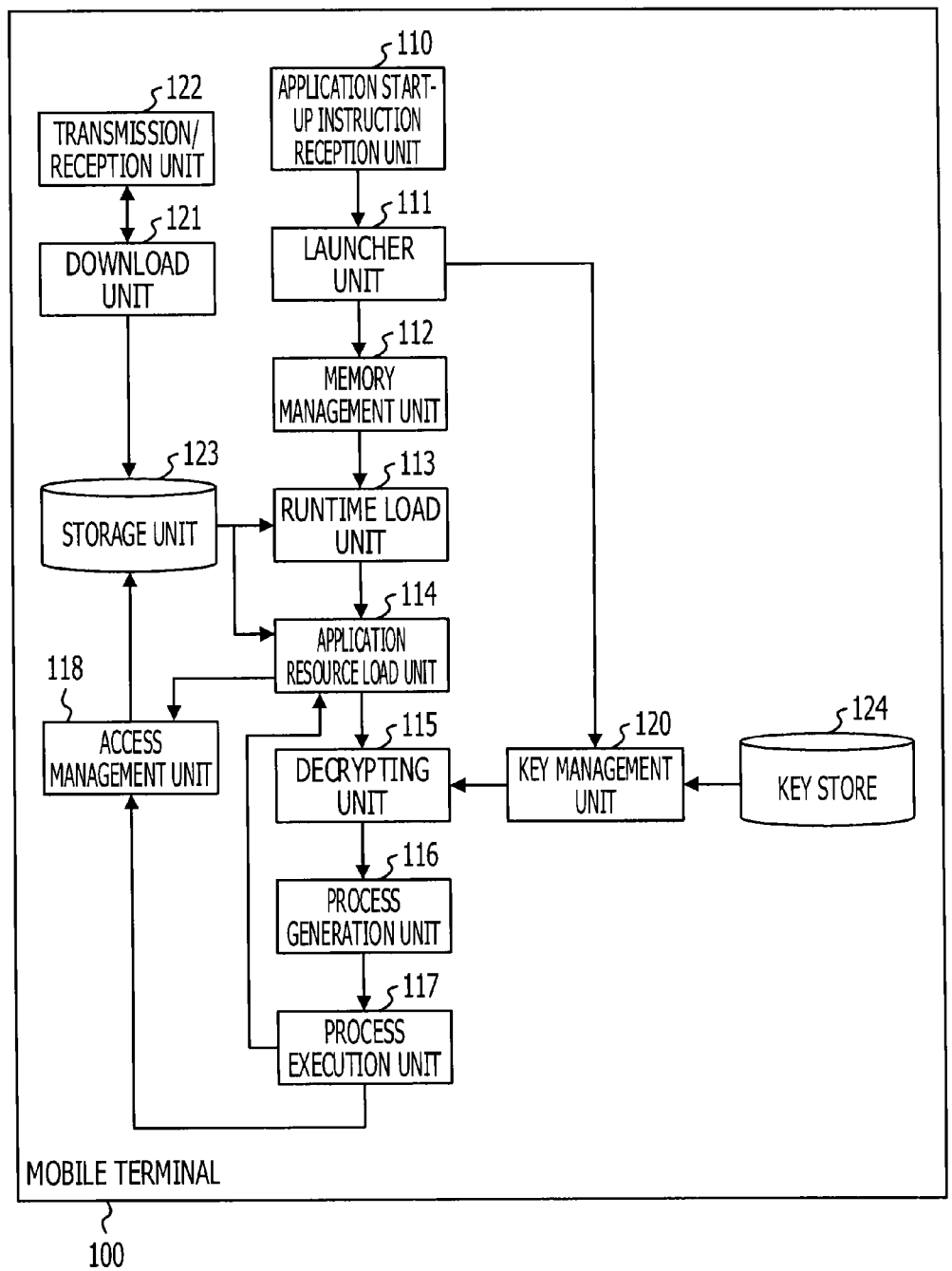
FIG. 5 is a schematic diagram of functional blocks of the mobile terminal according to the embodiment.

FIG. 5 is a schematic diagram of functional blocks of the mobile terminal 100 according to the embodiment.

As illustrated in FIG. 5, the mobile terminal 100 according to the embodiment includes the application start-up instruction reception unit 110, the launcher unit 111, the memory management unit 112, the runtime load unit 113, the application resource load unit 114, the decrypting unit 115, the process generation unit 116, the process execution unit 117, the access management unit 118, the key management unit 120, the download unit 121, a storage unit 123, and a key store 124.

Any of the application start-up instruction reception unit 110, the launcher unit 111, the memory management unit 112, the runtime load unit 113, the application resource load unit 114, the decrypting unit 115, the process generation unit 116, the process execution unit 117, the access management unit 118, the key management unit 120, the download unit 121, the storage unit 123, and the key store 124 are realized by the CPU 101 executing various programs read into the main memory 102.

The application start-up instruction reception unit 110 receives an application start-up instruction from the application server 200 and notifies the launcher unit 111 of the application start-up instruction. The application start-up instruction specifies the application resource 1200a or 1200b and instructs start-up of the application resource 1200a or 1200b.

The launcher unit 111 issues a start-up instruction of the runtime 1300 with the specified application resource 1200a or 1200b as an argument on the basis of the application start-up instruction from the application start-up instruction reception unit 110. Further, the runtime 111 requests a key to decrypt the specified application resource 1200a or 1200b from the key management unit 120. However, start-up mechanism in the embodiment is not limited to this. For example, when a user taps an icon, the launcher unit 111 may issue a start-up instruction of the runtime 1300 with the application resource 1200a or 1200b corresponding to the icon as an argument.

The memory management unit 112 generates a process space to execute the specified application resource 1200a or 1200b in the main memory 102 on the basis of the start-up instruction of the runtime 1300. The process space is a secure memory space that is separate for each process of a program executed by the CPU 101.

The runtime load unit 113 loads the runtime 1300 stored in the storage unit 123 into the process space generated by the memory management unit 112.

The application resource load unit 114 loads the specified application resource 1200a or 1200b into the process space into which the runtime 1300 is loaded on the basis of an instruction from the runtime load unit 113. Further, the application resource load unit 114 may load a resource into the process space into which the runtime 1300 is loaded on the basis of an instruction from the process execution unit 117.

The decrypting unit 115 decrypts a key transferred from the key management unit 120. Further, the decrypting unit 115 operates as a part of the runtime 1300 and decrypts the application resource 1200a or 1200b, which is loaded into the process space, in the process space by using the decrypted key.

The process generation unit 116 generates a process of the application program 1400a or 1400b by integrating and compiling the application resource 1200a or 1200b and the runtime 1300 which are loaded into the process space.

The process execution unit 117 executes a process of the application program 1400a or 1400b generated in the process space. Further, the process execution unit 117 may instruct the application resource load unit 114 to load a resource used to execute the process while the process is being executed.

The access management unit 118 allows or restricts file access by the process execution unit 117 or the application resource load unit 114 on the basis of an access permission given in an access right table. The file access means one of reading, writing, or executing the application resource 1200a or 1200b and various application programs, which are stored in the storage unit 123.

The key management unit 120 acquires a key to decrypt the application resource 1200a or 1200b from the key store 124 on the basis of the request from the launcher unit 111. The key acquired from the key store 124 is stored in the key management unit 120. Further, the key management unit 120 encrypts the key acquired from the key store 124 by using, for example, a key generated based on information unique to the mobile terminal 100 and transfers the encrypted key to the decrypting unit 115. For example, a function of inter-process communication provided by the OS 1100 may be used to transfer the key. In the embodiment, when Android is used as the OS 1100, the Intent mechanism may be used for example.

The download unit 121 receives the application resource 1200a or 1200b transmitted from the application server 200 via a transmission/reception unit 122 and stores the application resource 1200a or 1200b in a data area Rd of the storage unit 123. Further, the download unit 121 may receive a runtime and an application program as a native application stored in the application server 200 from the transmission/reception unit 122 in addition to the application resource 1200a or 1200b and store the runtime and the application program in the storage unit 123. However, the runtime and the application program as a native application are stored in an application area different from the data area Rd of the storage unit 123.

When a URL 1700 of the application resource 1200a or 1200b is transmitted from the application server 200, the download unit 121 may instruct the transmission/reception unit 122 to transmit a transmission request of the application resource 1200a or 1200b.

The transmission/reception unit 122 receives an encrypted application resource 1200a transmitted from the application server 200. When the URL 1700 of the application resource 1200a or 1200b is transmitted from the application server 200, the transmission/reception unit 122 transmits the transmission request of the application resource 1200a or 1200b specified by the URL 1700 to the application server 200 on the basis of the instruction from the download unit 121. When a token sent with the request, the transmission/reception unit 122 may transmit the transmission request including the token as additional information. That can prevent the mobile terminal which does not receive the request from getting the application.

For example, the storage unit 123 is constructed in the auxiliary memory 103 of the mobile terminal 100. The storage unit 123 stores, for example, the application program 1000, the OS 1100, the application resources 1200a and 1200b, the runtime 1300, and something like that. Further, an access permission provided by the OS 1100 is set to files stored in the storage unit 123.

For example, the key store 124 is constructed in the auxiliary memory 103 of the mobile terminal 100. The key store 124 stores a key to decrypt the application resource 1200a or 1200b. The keys stored in the key store 124 are desired to be protected more securely than the other data by using a hardware function or the like. For example, by using TRUSTZONE function included in some ARM processors, it may be possible to stop malicious software from taking out a key.

Although, in the embodiment, the key store 124 is constructed in the auxiliary memory 103, the embodiment is not limited to this. For example, a memory chip is provided separately from the auxiliary memory 103 in which the application resource 1200a or 1200b is stored, and the key store 124 may be constructed in the memory chip.

Access Right Table T

Here, the access right set in the application program by the OS 1100 will be described.

Figure 6:
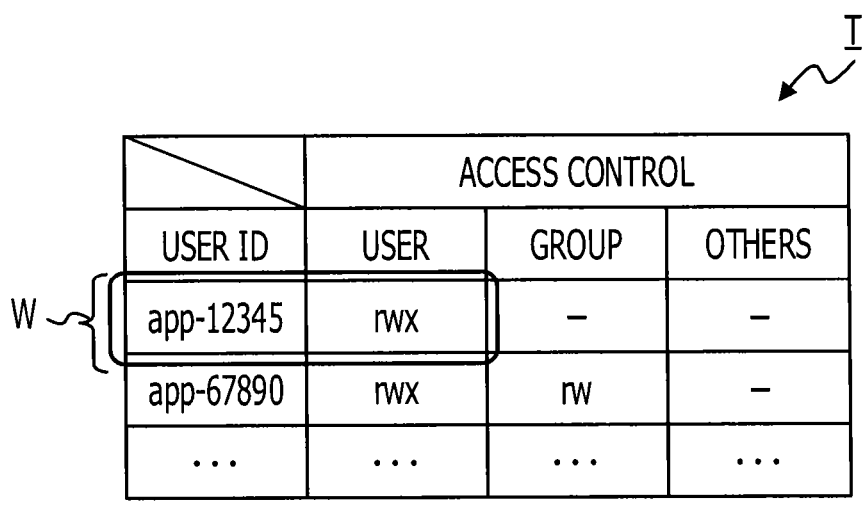
FIG. 6 is a schematic diagram of an access right table according to the embodiment.

FIG. 6 is a schematic diagram of the access right table T according to the embodiment.

As illustrated in FIG. 6, the access right table T according to the embodiment associates a User ID of an application program with an access right to the application program (access control). In the embodiment, Android is used as the OS 1100, so that a unique name associated with a name of an application ("Runtime", "App", and the like) is assigned to a User ID. For example, it is assumed that a name "app-12345" is assigned to "Runtime" and a name "appp-67890" is assigned to "App". In FIG. 6, "r", "w", and "x" represent readable, writable, and executable respectively.

For example, when focusing on a field W in the access right table T, "r", "w", and "x" are assigned to an application program whose User ID is "app-12345", that is, the runtime 1300, as an access right of User (owner). It means that a process of the runtime 1300 has permission to read, write, and execute data owned by the runtime 1300 stored in the storage unit 123.

Functional Blocks of Application Server 200

Figure 7:
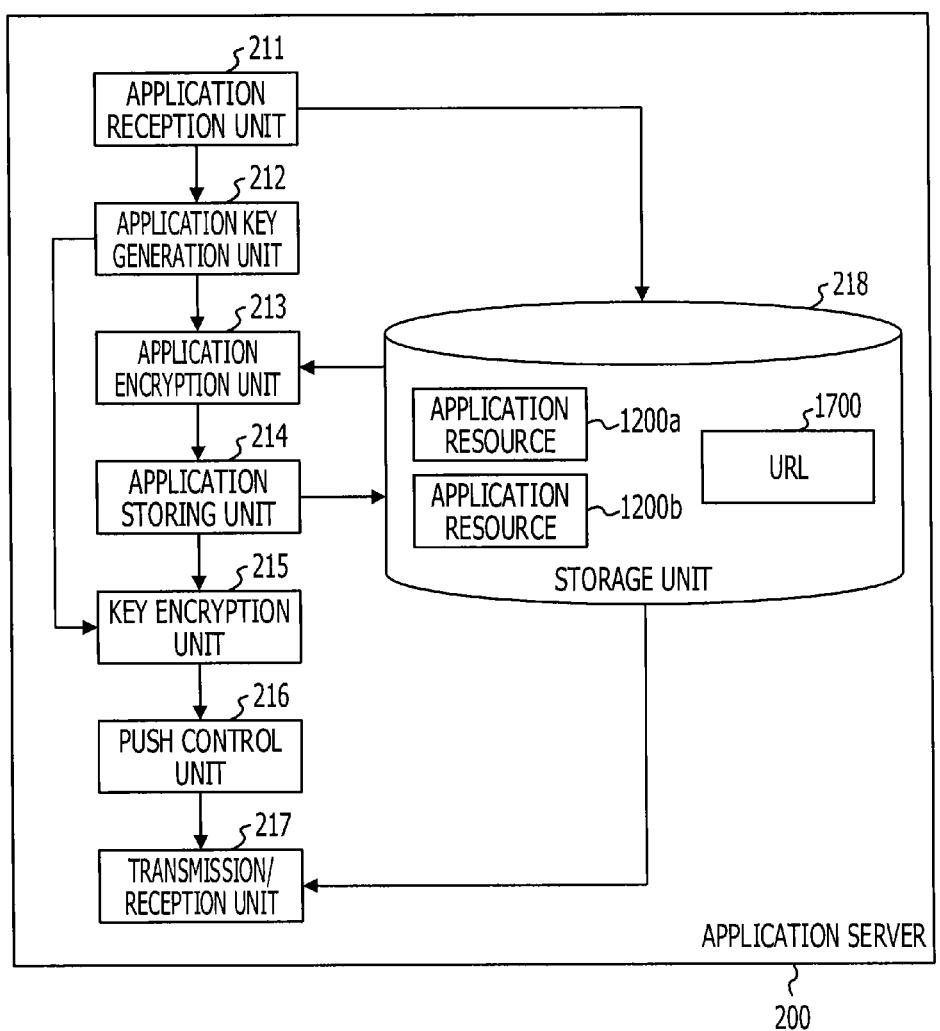
FIG. 7 is a schematic diagram of functional blocks of the application server according to the embodiment.

FIG. 7 is a schematic diagram of functional blocks of the application server 200 according to the embodiment.

As illustrated in FIG. 7, the application server 200 according to the embodiment includes an application reception unit 211, an application key generation unit 212, an application encryption unit 213, an application storing unit 214, a key encryption unit 215, a push control unit 216, a transmission/reception unit 217, and a storage unit 218.

The application reception unit 211, the application key generation unit 212, the application encryption unit 213, the application storing unit 214, the key encryption unit 215, the push control unit 216, and the transmission/reception unit 217 are realized by the CPU 201 executing various programs load into the main memory 202.

The application reception unit 211 receives registration of the application resources 1200a and 1200b developed by an application developer. The application reception unit 211 may receive registration of an application program as a native application in addition to the application resources.

The application key generation unit 212 generates a key to encrypt a specified application resource 1200a or 1200b. The key is generated based on the application resource 1200a or 1200b and information unique to the mobile terminal 100 of a transmission destination and is unique to each application and the mobile terminal 100 of a transmission destination. The method of encryption is not particularly limited.

The application encryption unit 213 encrypts the application resource 1200a or 1200b by using the key generated by the application key generation unit 212.

The application storing unit 214 stores the application resource 1200a or 1200b encrypted by the application encryption unit 213 into the storage unit 218.

The key encryption unit 215 encrypts the key to encrypt the application resource 1200a or 1200b by using a key generated based on information unique to the mobile terminal 100.

The push control unit 216 instructs the transmission/reception unit 217 to transmit the application resource 1200a or 1200b or the URL 1700 of the application resource 1200a or 1200b and the key generated by the application key generation unit 212 on the basis of, for example, position information acquired from a sensor of the mobile terminal 100 and context information. Further, as auxiliary information, token information to acquire a specified application may be added.

The transmission/reception unit 217 transmits the URL 1700 or the application resource 1200a or 1200b stored in the storage unit 218 and the key to decrypt the URL 1700 or the application resource 1200a or 1200b to the mobile terminal 100 on the basis of the instruction from the push control unit 216.

For example, the storage unit 218 is constructed in the auxiliary storage device 206 of the application server 200. The storage unit 218 stores, for example, the application program 2000, the OS 2100, the application resources 1200a and 1200b, and the like. Further, the storage unit 218 may store the runtime 1300.

Download of Application Resource by CPU 101 of Mobile Terminal 100

Figure 8:
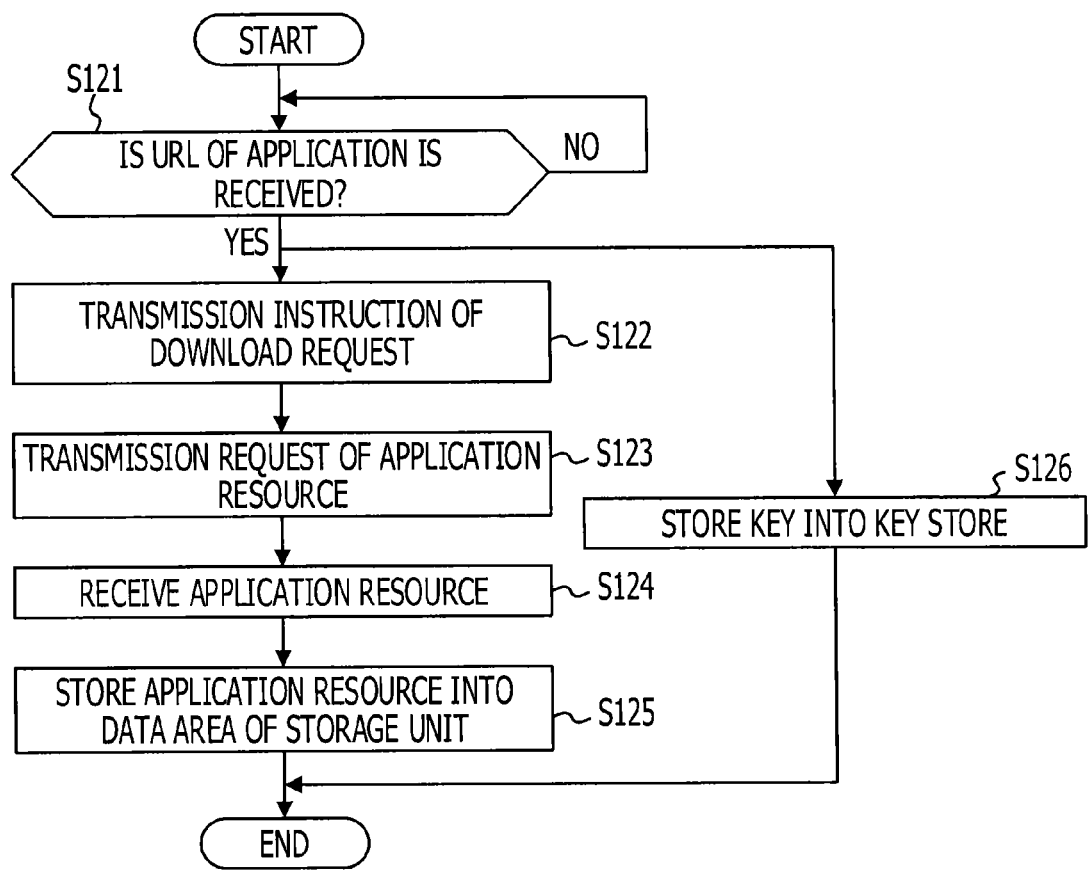
FIG. 8 is a flowchart of downloading application resources by a CPU of the mobile terminal according to the embodiment.

FIG. 8 is a flowchart of downloading the application resource 1200*a* or 1200*b* by the CPU 101 of the mobile terminal 100 according to the embodiment.

As illustrated in FIG. 8, the transmission/reception unit 122 determines whether or not the URL 1700 of the application transmitted from the application server 200 is received (step S121).

Here, if it is determined that the URL 1700 of the application is received (Yes in step S121), the download unit 121 instructs the transmission/reception unit 122 to transmit a download request for the application resource (here, the application resource 1200*a*) specified by the URL 1700 (step S122).

On the other hand, if it is determined that the URL 1700 of the application is not received (No in step S121), the transmission/reception unit 122 continues to determine whether or not the URL 1700 of the application is received (step S121).

The application server 200 transmits a key to decrypt the application resource 1200*a* along with the transmission of the URL 1700 of the application. The transmission/reception unit 122 transfers the key transmitted from the application server 200 to the key management unit 120. Then, the key management unit 120 stores the key transferred from the transmission/reception unit 122 into the key store 124 (step S126). At this time, the key management unit 120 stores the key into the key store 124 after decrypting the key transferred from the application server 200 by using a key unique to the mobile terminal 100.

Next, the transmission/reception unit 122 transmits a transmission request of the specified application resource 1200*a* to the application server 200 on the basis of the download request from the download unit 121 (step S123). When there is a token, the transmission/reception unit 122 may transmit the transmission request including the token as additional information. Thereby, the application server 200 transmits the specified application resource 1200*a* to the mobile terminal 100.

The application resource 1200*a* transmitted from the application server 200 is encrypted by a key unique to the application resource 1200*a* and the mobile terminal 100. Therefore, the transmission/reception unit 122 of the mobile terminal 100 receives the encrypted application resource 1200*a* (step S124). Then, the transmission/reception unit 122 transfers the application resource 1200*a* to the download unit 121.

Next, the download unit 121 stores the application resource 1200*a* transferred from the transmission/reception unit 122 into the storage unit 123 (step S125). At this time, because the mobile terminal 100 recognizes the application resource 1200*a* as only a data file, the application resource 1200*a* is stored in the data area of the storage unit 123.

An access permission whose User (owner) is the runtime 1300 is set to each data file at this time. Therefore, only a process of the runtime 1300 can access the data files stored in the data area Rd of the storage unit 123. In other words, any process which the user Id is the runtime 1300 can access the data files stored in the data area Rd of the storage unit 123.

Then, the download of the application resource 1200*a* is completed.

The download of the application resource is performed every time an execution instruction of an application is issued. Therefore, for example, when the application resource 1200*a* is downloaded and then further an execution instruction of another application (here, an application of the application resource 1200*b*) is issued, the application resource 1200*b* is stored in the storage unit 123 through the same procedure as described above. At this time, the application resource 1200*b* is recognized as only a data file, so that the application resource 1200*b* is stored in the data area Rd where the application resource 1200*a* is stored.

As described above, when the mobile terminal 100 according to the embodiment downloads a plurality of application resources 1200*a* and 1200*b* from the application server 200, all the application resources 1200*a* and 1200*b* are stored in the common data area Rd as data files and the same access permission whose User (owner) is the runtime 1300 is set to each data file.

Here, the mobile terminal 100 transmits a download request to the application server 200 on the basis of the URL 1700 of the application transmitted from the application server 200. However, the embodiment is not limited to this. For example, the application server 200 may transmit the application resource 1200*a* or 1200*b*, which is determined to be desirable by the application server 200, to the mobile terminal 100 on the basis of information, such as position information acquired from a sensor of the mobile terminal 100 and context information. In other words, when the requested application resource 1200*a* or 1200*b* is transmitted to the mobile terminal 100 on the basis of the determination of the application server 200, steps S121 to S124 described above are omitted.

Execution of Application by CPU 101 of Mobile Terminal 100

Figure 9:
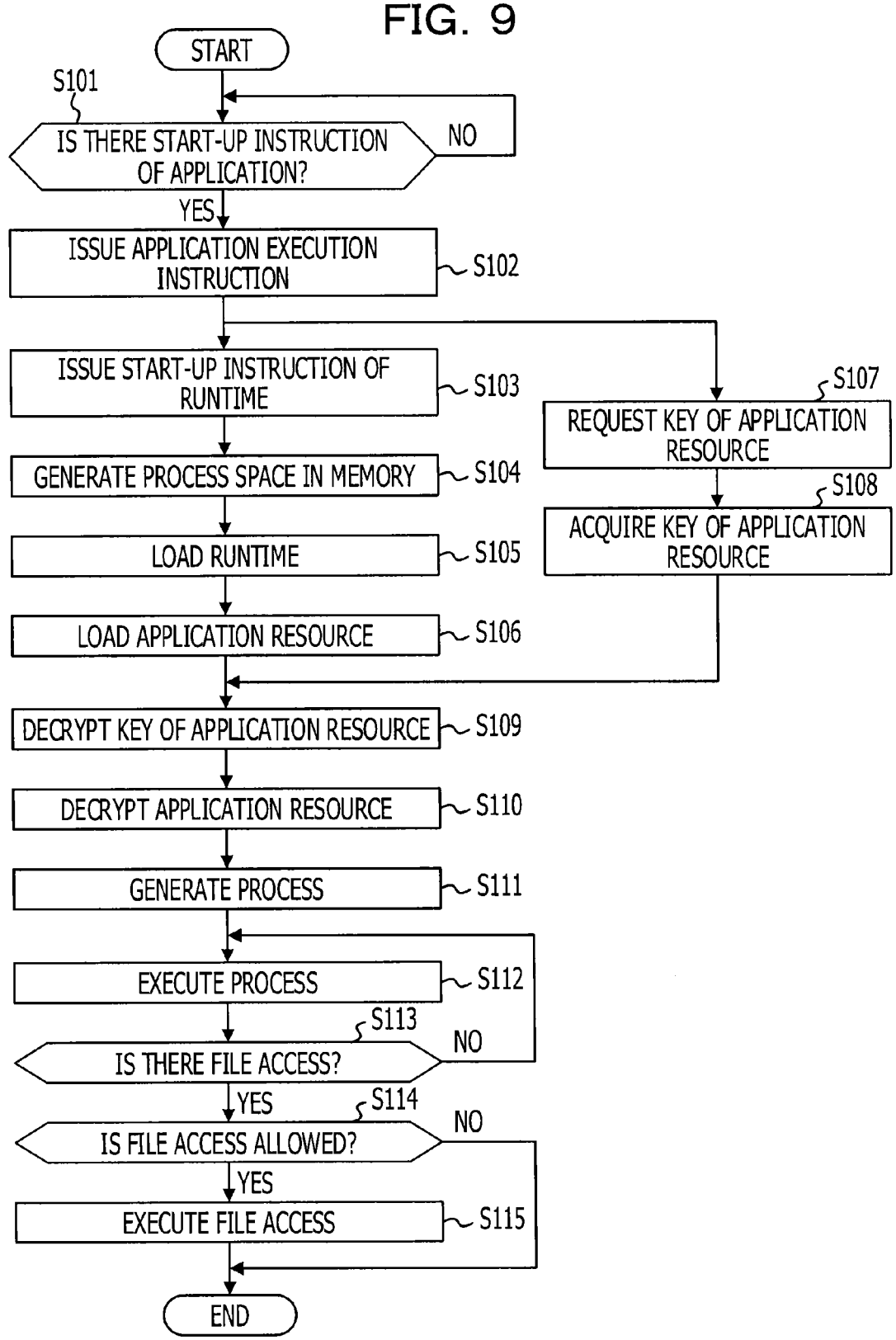
FIG. 9 is a flowchart of executing an application by the CPU of the mobile terminal according to the embodiment.
Figure 10:
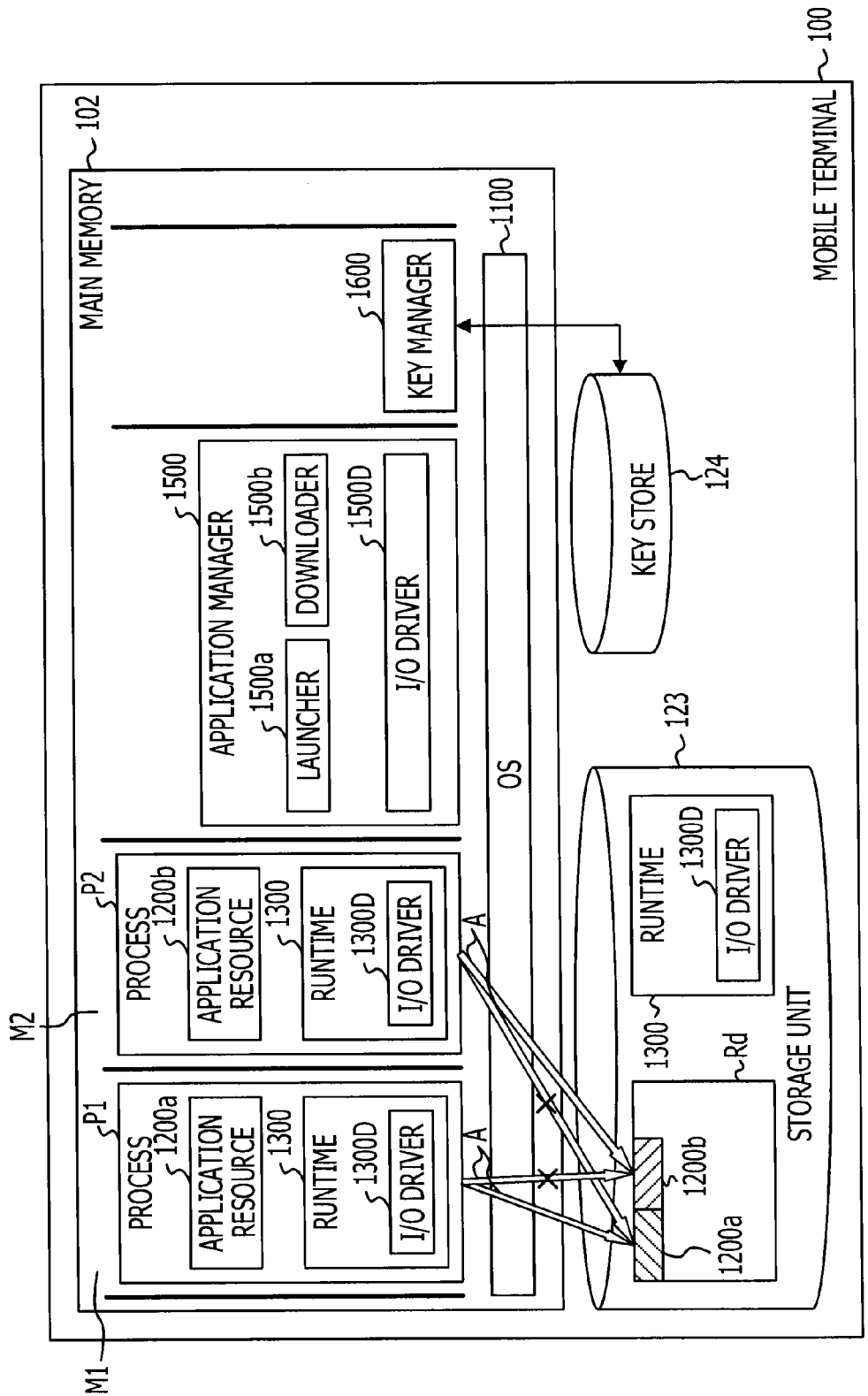
FIG. 10 is a schematic diagram for explaining a restriction of access to a file stored in a storage unit according to the embodiment.
Figure 11:
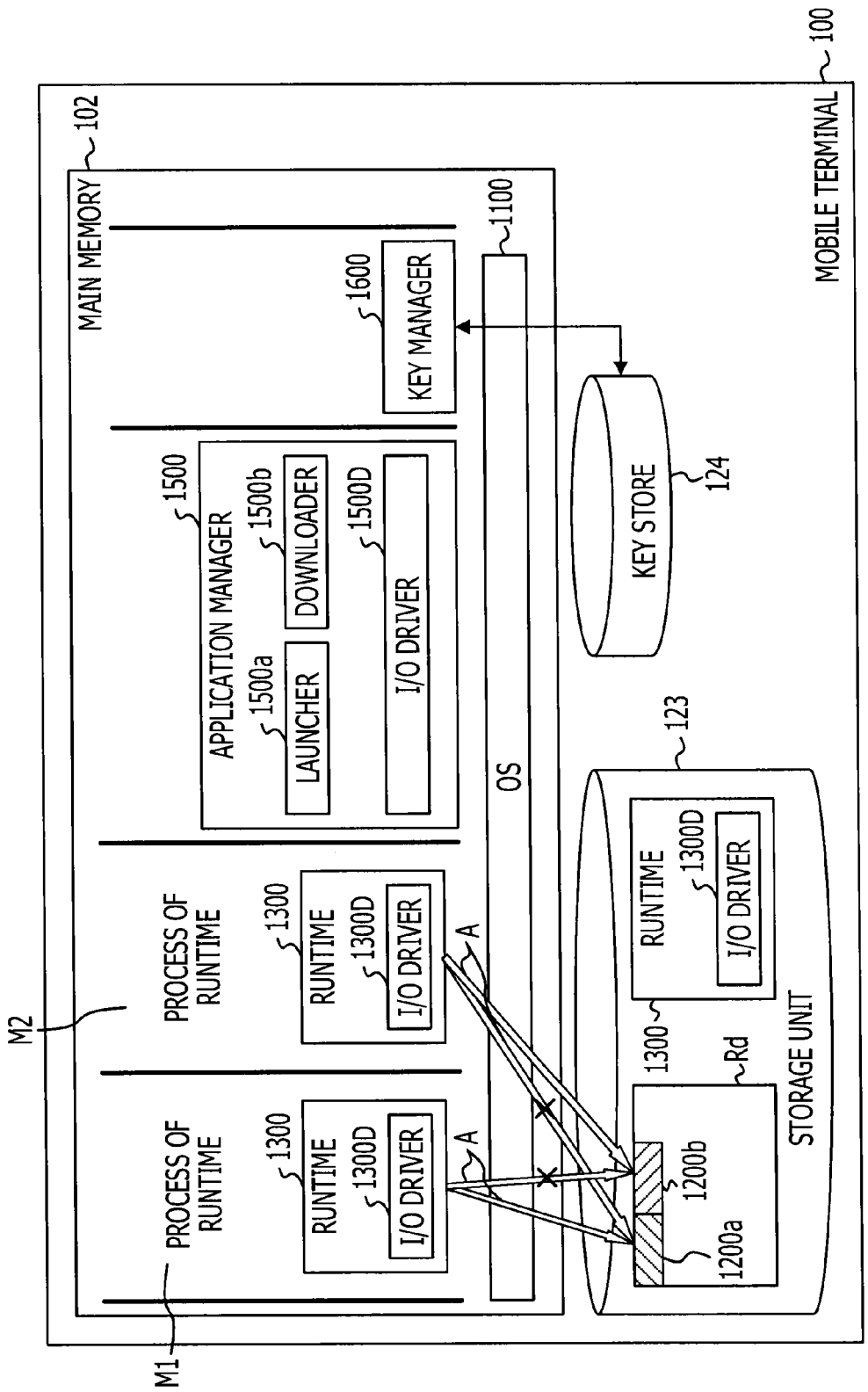
FIG. 11 is a schematic diagram for explaining a restriction of access to a file stored in the storage unit according to the embodiment.

FIG. 9 is a flowchart of executing an application by the CPU 101 of the mobile terminal 100 according to the embodiment. FIG. 10 is a schematic diagram for explaining a restriction of access to a file stored in the storage unit 123 according to the embodiment. FIG. 11 is a schematic diagram for explaining a restriction of access to a file stored in the storage unit 123 according to the embodiment.

In the description below, it is assumed that the application resources 1200*a* and 1200*b* and the runtime 1300 are stored in the storage unit 123 of the mobile terminal 100.

As illustrated in FIG. 9, first, the application start-up instruction reception unit 110 determines whether or not a start-up instruction of an application (here, application of the application resource 1200*a*) transmitted from the application server 200 is received (step S101). When the application resource 1200*a* is transmitted from the application server 200, it may be determined that the start-up instruction of an application is received.

Here, if it is determined that the start-up instruction of an application is received (Yes in step S101), the application start-up instruction reception unit 110 issues an application execution instruction to the launcher unit 111 (step S102).

On the other hand, if it is determined that the start-up instruction of an application is not received (No in step S101), the application start-up instruction reception unit 110 continuously determines whether or not a start-up instruction of an application is received (step S101).

Next, the launcher unit 111 issues a start-up instruction of the runtime 1300 with a file name of the specified application resource 1200*a* as an argument on the basis of the application execution instruction from the application start-up instruction reception unit 110 (step S103).

Further, the launcher unit 111 requests a key to decrypt the specified application resource 1200*a* from the key management unit 120 (step S107).

Next, the memory management unit 112 generates a process space M1 to execute the runtime 1300 and the application resource 1200*a* in the main memory 102 (step S104).

Next, the runtime load unit 113 loads the runtime 1300 stored in the storage unit 123 into the process space M1 generated by the memory management unit 112 (step S105). Thereby, a process of the runtime 1300 is generated in the process space M1.

Next, the application resource load unit 114 further loads the application resource 1200a into the process space M1 into which the runtime 1300 is loaded (step S106).

In parallel with the above, the key management unit 120 acquires a key to decrypt the application resource 1200a from the key store 124 on the basis of the request from the launcher unit 111 (step S108). Further, the key management unit 120 encrypts the key acquired from the key store 124. The encrypted key is transferred to the decrypting unit 115 by using a function of inter-process communication provided by the OS 1100. The method of encryption is not particularly limited.

Next, the decrypting unit 115 decrypts the key transferred from the key management unit 120 (step S109) and decrypts the application resource 1200a loaded into the process space M1 by using the decrypted key (step S110). In other words, the application resource 1200a is loaded into the process space M1 and then decrypted (converted into a plain text).

Next, the process generation unit 116 generates a process P1 of the application program 1400a in the process space M1 by integrating and compiling the application resource 1200a decrypted by the decrypting unit 115 and the runtime 1300 (step S111).

The process P1 is a process of the application program 1400a, which is a hybrid application including the application resource 1200a and the runtime 1300. However, the OS 1100 recognizes the application resource 1200a as only data, so that the OS 1100 recognizes the process P1 as a process of the runtime 1300.

Next, the process execution unit 117 executes the process P1 of the application program 1400a (step S112).

Next, the access management unit 118 determines whether or not the process P1 executed by the process execution unit 117 requires an access to a file stored in the storage unit 123 (step S113).

Here, if it is determined that the process P1 requires an access to an application resource (for example, icon image) (Yes in step S113), the access management unit 118 refers to an access permission in the access right table T and determines whether the access is valid or not (step S114).

On the other hand, if it is determined that the process P1 does not requires an access to an application resource (No in step S113), the process execution unit 117 continuously executes the process P1 of the application program 1400a (step S112).

When it is determined that the process P1 requires an access to an application resource (Yes in step S113) and the process P1 is allowed to access the application resource (Yes in step S114), the process execution unit 117 accesses the application resource, such as reading, writing, or executing the application resource stored in the storage unit 123 (step S115).

The mobile terminal 100 according to the embodiment performs the series of processes described above for each execution of an application. Therefore, for example, when another application (here, the application of the application resource 1200b) is executed after the process P1 of the application program 1400a is generated, a process P2 of the application program 1400b is generated. Furthermore, both the processes P1 and P2 of the application programs 1400a and 1400b are recognized as a process of the runtime 1300.

Therefore, as indicated by arrows A in FIG. 10, the process P1 and the process P2 are allowed to access both the application resources 1200a and 1200b stored in the data area Rd of the storage unit 123. If this is left unattended, for example, when the process P1 is a malicious process, the process P1 may make an unauthorized access to the application resource 1200b stored in the storage unit 123 and tamper the application resource 1200b.

Therefore, in the embodiment, the application resources 1200a and 1200b stored in the data area Rd of the storage unit 123 are individually encrypted by using a different key for each application resource. Further, the process P1 has only a key to decrypt the application resource 1200a of the process P1 and the process P2 has only a key to decrypt the application resource 1200b of the process P2.

Therefore, the process P1 may possibly not perform reading, writing, or executing the application resource 1200b stored in data area Rd of the storage unit 123. Similarly, the process P2 may not perform reading, writing, or executing the application resource 1200a stored in data area Rd of the storage unit 123.

Thereby, even if an application resource downloaded to the mobile terminal 100 performs a malicious operation in the mobile terminal 100, it is possible to protect the application resources 1200a and 1200b stored in the data area Rd of the storage unit 123 from, for example, a threat of unauthorized access.

Further, the application resource load unit 114 executes loading the application resource 1200a or 1200b as a process of the runtime 1300. Therefore, as indicated by arrows B in FIG. 11, processes of the runtime 1300 are allowed to access both the application resources 1200a and 1200b stored in the data area Rd of the storage unit 123.

However, in the embodiment, as described above, the application resources 1200a and 1200b stored in the data area Rd of the storage unit 123 are individually encrypted by one of keys different from each other. Further, a process of the runtime 1300 has only a key to decrypt a specified application resource 1200a or 1200b.

Therefore, a process of the runtime 1300 started with the application resource 1200a as an argument may not read the application resource 1200b stored in the data area Rd of the storage unit 123. Similarly, a process of the runtime 1300 started with the application resource 1200b as an argument may not read the application resource 1200a stored in the data area Rd of the storage unit 123.

Thereby, when the mobile terminal 100 tries to execute the application program 1400a, the process of the runtime 1300 does not read the application resource 1200b stored in the data area Rd of the storage unit 123. On the other hand, when the mobile terminal 100 tries to execute the application program 1400b, the process of the runtime 1300 does not read the application resource 1200a stored in the data area Rd of the storage unit 123. As a result, the mobile terminal 100 according to the embodiment may reliably execute the specified application.

According to the embodiment, the process P1 or P2 of the application program 1400a or 1400b is generated by downloading the application resource 1200a or 1200b from the application server 200 and executing the process P1 or P2 of the application program 1400a or 1400b on the runtime 1300 pre-installed in the mobile terminal 100.

Therefore, it is possible to reduce the amount of data downloaded from the application server 200 by the amount of data of the runtime 1300. Further, the mobile terminal 100 does not recognize the application resources 1200a and 1200b as an application program, so that when the application resource 1200a or 1200b is downloaded, no confirmation display (consent button or the like) is generated for a user of the mobile terminal 100. Therefore, it is possible to realize reduction of cumbersome feeling of the user of the mobile terminal 100 and reduction of inefficient consumption of the storage area of the mobile terminal 100.

Further, according to the embodiment, every time the application resources 1200*a* and 1200*b* are executed, the process spaces M1 and M2 separated from each other are generated and a set of the runtime 1300 and the application resource 1200*a* and a set of the runtime 1300 and the application resource 1200*b* are loaded into the process spaces M1 and M2 respectively. In other words, a plurality of application resources 1200*a* and 1200*b* are not loaded into the process space M1 or M2. Therefore, a plurality of application resources 1200*a* and 1200*b* do not interfere with each other in the process space M1 or M2.

According to the embodiment, the application resources 1200*a* and 1200*b* stored in the data area Rd of the storage unit 123 are individually encrypted by one of keys different from each other. Further, the process P1 is given only a key to decrypt the application resource 1200*a* of the process P1 and the process P2 is given only a key to decrypt the application resource 1200*b* of the process P2. Therefore, the processes P1 and P2 can only access their own application resources in the application resources stored in the data area Rd of the storage unit 123. Thereby, it is possible to protect the application resources 1200*a* and 1200*b* stored in the storage unit 123 of the mobile terminal 100 from, for example, a risk of unauthorized access due to a malicious application resource.

Further, it is possible to obtain the function described above by only adding the application resource load unit 114, the decrypting unit 115, and the process generation unit 116, which are performed by the runtime 1300, the launcher unit 111 and the download unit 121 which are performed by the application manager 1500, and the key management unit 120 which is performed by the key manager 1600 (in other words, by still using the existing OS 1100).

MODIFIED EXAMPLE

Figure 12:
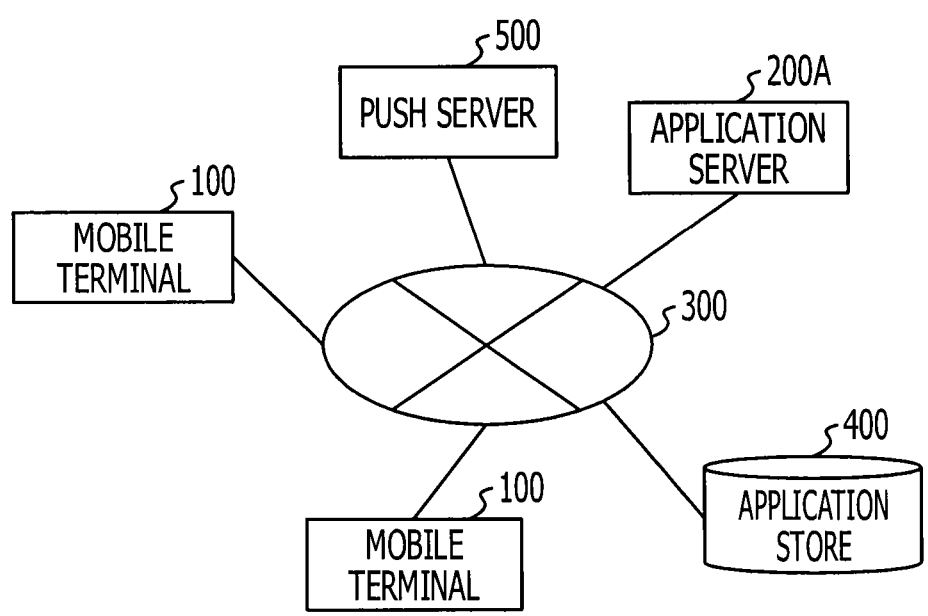
FIG. 12 is a schematic diagram of an information processing apparatus according to a modified example of the embodiment.

FIG. 12 is a schematic diagram of an information processing apparatus according to a modified example of the embodiment.

Although, in the embodiment described above, the application server 200 includes a function to store the application resource and a function to push the application resource, the embodiment is not limited to this.

For example, as illustrated in FIG. 12, it is possible to use an application server 200A which does not include the function to store the application resource and the function to push the application resource. In this case, an application store 400 including the storage unit 218 that stores the application resource and a push server 500 including the push control unit 216 that controls push of the application resource are provided separately and the application store 400 and the push server 500 may be connected to each other through the network 300.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus that executes application programs, the information processing apparatus comprising:
a memory; and
a processor coupled to the memory and configured to:
generate a first process space in the memory to invoke a first application program of the application programs,
generate a second process space to invoke a second application program, the second process space being separate from the first process space,
load a runtime for the application programs into the first process space,
load a first application resource for executing the first application program into the first process space,
generate a first process of the first application program based on the first application resource and the runtime which are loaded into the first process space,
execute the first process of the first application program in the first process space separately from the second process space,
load the runtime into the second process space,
load a second application resource for executing the second application program into the second process space,
generate a second process of the second application program based on the second application resource and the runtime which are loaded into the second process space, and
execute the second process of the second application program in the second process space separately from the first process space, wherein
the first and second application programs are hybrid application programs, and
the runtime is a native application program which enables an application source to be executed as one of the application programs.

2. The information processing apparatus according to claim 1, wherein
the first application resource to be loaded into the first process space is encrypted in a storage,
the second application resource to be loaded into the second process space is encrypted in a storage, and
the processor is further configured to:
manage a first key to decrypt the encrypted first application resource,
manage a second key to decrypt the encrypted second application resource,
decrypt the encrypted first application resource loaded into the first process space by the first key, and
decrypt the encrypted second application resource loaded into the second process space by the second key.

3. The information processing apparatus according to claim 2, wherein the processor is further configured to:
encrypt the first key and the second key,
decrypt the encrypted first key and the encrypted second key,
decrypt the first application resource loaded into the first process space by the decrypted first key, and
decrypt the second application resource loaded into the second process space by the decrypted second key.

4. The information processing apparatus according to claim 3, wherein
the processor is further configured to:
request the first key based on a start-up instruction of the first application program, and request the second key based on a start-up instruction of the second application program.

5. The information processing apparatus according to claim 2, wherein
the memory stores a plurality of application resources encrypted by different keys each of which is used for one of the application programs.

6. The information processing apparatus of claim 1, wherein
the first application resource and the second application resource are stored in the information processing apparatus separately from the runtime.

7. The information processing apparatus of claim 1, wherein
the first application resource to be loaded into the first process space is encrypted in a storage.

8. The information processing apparatus of claim 7, wherein the processor is configured to:
load the encrypted first application resource from the storage into the first process space, and
provide only the first process with a first key to decrypt the encrypted first application resource which is loaded into the first process space.

9. The information processing apparatus of claim 8, wherein
the processor is further configured not to provide the second process with the key.

10. The information processing apparatus of claim 8, wherein
the second application resource to be loaded into the second process space is encrypted in the storage, and
the processor is further configured to:
load the encrypted second application resource from the storage into the second process space, and
provide only the second process with a second key to decrypt the decrypted second application resource which is loaded into the second process space.

11. The information processing apparatus of claim 8, wherein the processor is further configured to:
encrypt the first key to be provided only the first process, and
decrypt the encrypted first key when decrypting the encrypted first application resource which is loaded into the first process space.

12. The information processing apparatus of claim 1, wherein
the first application resource includes a first program for executing the first application program, a first image being accessed when the first application program is executed, or a combination thereof.

13. The information processing apparatus of claim 12, wherein the first program is based on one of Hyper Text Markup Language and JavaScript.

14. The information processing apparatus of claim 12, wherein the first image is an icon image for the first application program.

15. The information processing apparatus of claim 1, wherein the first application resource has been developed in a specific application development environment on a premise of the runtime that is configured to decrypt an encrypted application resource.

16. The information processing apparatus of claim 1, wherein the first application resource is distributed to the information processing apparatus separately from the runtime.

17. The information processing apparatus of claim 1, wherein
the first and second application programs are hybrid application programs, and
the runtime is a native application program which enables an application source to be executed as one of the application programs.

18. An information processing method of an information processing apparatus that executes application programs, the information processing method comprising:
generating a first process space in a memory to invoke a first application program of the application programs,
generating a second process space to invoke a second application program, the second process space being separate from the first process space;
loading a runtime for the application programs into the first process space;
loading a first application resource for executing the first application program into the first process space;
generating a first process of the first application program based on the first application resource and the runtime which are loaded into the first process space;
executing the first process of the first application program in the first process space separately from the second process space;
loading the runtime into the second process space,
loading a second application resource for executing the second application program into the second process space,
generating a second process of the second application program based on the second application resource and the runtime which are loaded into the second process space, and
executing the second process of the second application program in the second process space separately from the first process space, wherein
the first and second application programs are hybrid application programs, and
the runtime is a native application program which enables an application source to be executed as one of the application programs.

19. The information processing method according to claim 18, wherein
the loading the first application resource includes loading an encrypted first application resource into the first process space, the encrypted first application resource being encrypted by a first key,
the loading the second application resource includes loading an encrypted second application resource into the second process space, the encrypted second application resource being encrypted by a second key, and
the information processing method further includes:
decrypting the encrypted first application resource loaded into the first process space by the first key, and
decrypting the encrypted second application resource loaded into the second process space by the second key.

20. A non-transitory medium for storing a program of an information processing apparatus that executes application programs, the program causing the information processing apparatus to execute a process, the process comprising:
generating a first process space in a memory to invoke a first application program of the application programs,
generating a second process space to invoke a second application program, the second process space being separate from the first process space;
loading a runtime for the application programs into the first process space;

loading a first application resource for executing the first application program into the first process space;

generating a first process of the first application program on the basis of the first application resource and the runtime which are loaded into the first process space;

executing the first process of the first application program in the first process space separately from the second process space, loading the runtime into the second process space, loading a second application resource for executing the second application program into the second process space, generating a second process of the second application program based on the second application resource and the runtime which are loaded into the second process space, and executing the second process of the second application program in the second process space separately from the first process space, wherein the first and second application programs are hybrid application programs, and the runtime is a native application program which enables an application source to be executed as one of the application programs.

* * * * *